United States Patent
Ito et al.

(10) Patent No.: US 6,877,787 B2
(45) Date of Patent: Apr. 12, 2005

(54) STRENGTH MEMBER FOR VEHICLE USE

(75) Inventors: Koichi Ito, Kariya (JP); Mikio Hirano, Obu (JP); Masafumi Kawashima, Kariya (JP); Hironori Suzuki, Obu (JP); Dai Matsui, Nagoya (JP); Kazushi Shikata, Kariya (JP); Mitsugu Yamanaka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/408,423

(22) Filed: Apr. 7, 2003

(65) Prior Publication Data
US 2003/0193207 A1 Oct. 16, 2003

(30) Foreign Application Priority Data

Apr. 10, 2002 (JP) ........................................ 2002-108032
Jan. 17, 2003 (JP) ........................................ 2003-009712

(51) Int. Cl.[7] ............................................. B62D 25/14
(52) U.S. Cl. ..................... 296/70; 296/190.09; 296/208
(58) Field of Search ........................... 296/190.09, 208, 296/70, 71, 72

(56) References Cited

U.S. PATENT DOCUMENTS

| | | | | |
|---|---|---|---|---|
| 5,549,344 A | * | 8/1996 | Nishijima et al. | 296/70 |
| 6,237,956 B1 | * | 5/2001 | Haba et al. | 280/779 |
| 6,378,934 B1 | * | 4/2002 | Palazzolo et al. | 296/208 |
| 6,422,633 B2 | * | 7/2002 | Neuss et al. | 296/70 |
| 6,497,432 B2 | * | 12/2002 | Scheib et al. | 280/779 |
| 6,502,897 B2 | * | 1/2003 | Neuss et al. | 296/208 |
| 6,517,114 B1 | * | 2/2003 | Scheib et al. | 280/779 |
| 6,648,402 B2 | * | 11/2003 | Scheib et al. | 296/203.02 |
| 6,668,513 B2 | * | 12/2003 | Roberts et al. | 52/735.1 |
| 6,676,202 B2 | * | 1/2004 | Brancheriau | 296/208 |
| 6,688,680 B1 | * | 2/2004 | Cooper et al. | 296/208 |
| 2002/0153750 A1 | * | 10/2002 | Feith et al. | 296/208 |
| 2003/0227195 A1 | * | 12/2003 | Charbonnel | 296/208 |
| 2004/0026952 A1 | * | 2/2004 | Shiono | 296/70 |
| 2004/0041432 A1 | * | 3/2004 | Baker et al. | 296/70 |

* cited by examiner

*Primary Examiner*—Jason Morrow
(74) *Attorney, Agent, or Firm*—Harness, Dickey & Pierce, PLC

(57) ABSTRACT

A strength member, for vehicle use, extending in the vehicle width direction inside an instrument panel of a vehicle has a reinforcing bar in which a closed space is formed, and the reinforcing bar has a driver's seat side region, a central region and an assistant driver's seat side region, the reinforcing bar being composed of a metallic member arranged in the driver's seat side region and a resin member or a resin and metallic member arranged in the central region and the assistant driver's seat side region.

22 Claims, 16 Drawing Sheets

Fig.9

| | TARGET VALUE | CONVENTIONAL EXAMPLE 1 | CONVENTIONAL EXAMPLE 2 | SECOND EXAMPLE 2 | THIRD EXAMPLE 3 |
|---|---|---|---|---|---|
| MINIMUM RESONANT FREQUENCY (Hz) | 35 | 40 | 36 | 36 | 36 |
| AIR BAG DEVELOPING LOAD (N/mm) | 500 | 3070 | 2000 | 587 | 1110 |
| LOAD ON REINFORCING BAR (g) | — | — | 2000 | 1194 | 1687 |
| LOAD ON ENTIRE STRUCTURE OF AIR-CONDITIONING DUCT (g) | — | 5880 | 5527 | 4721 | 5214 |

Fig.11
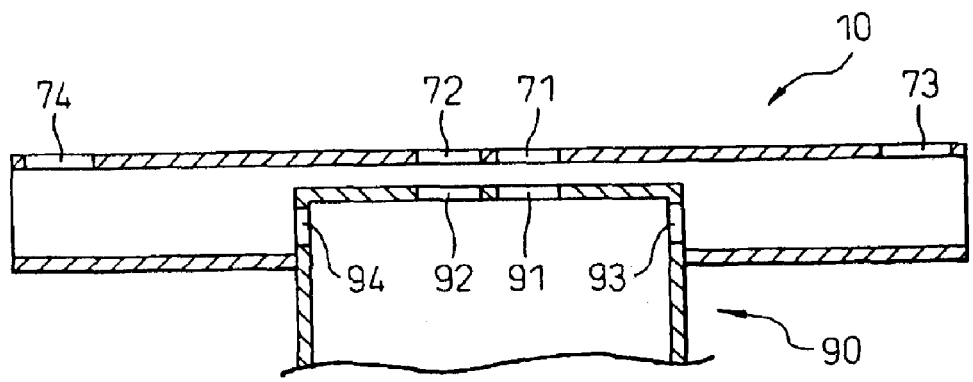
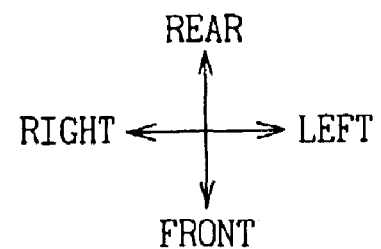

Fig.15A
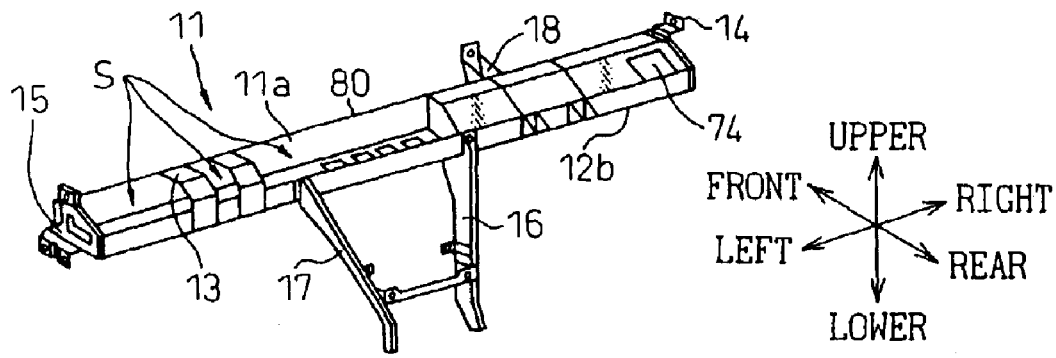
Fig.15B
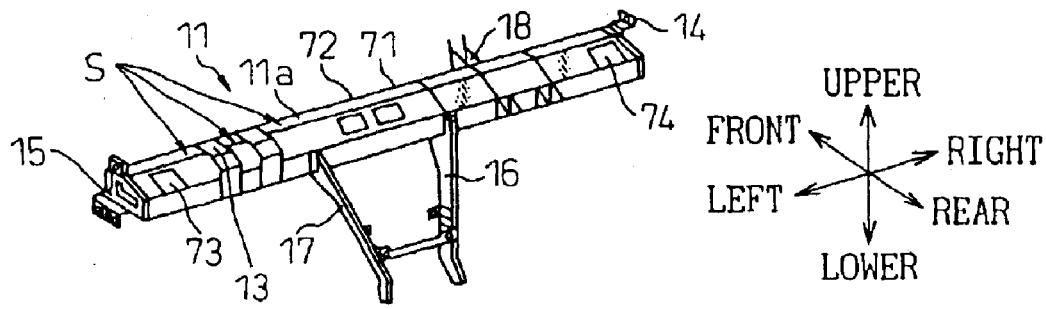
Fig.15C
| | CONVENTIONAL TYPE | TYPE A | TYPE B |
|---|---|---|---|
| WEIGHT OF REINFORCING BAR | 3400g | 2800g | 3100g |

STRENGTH MEMBER FOR VEHICLE USE

BACKGROUND OF THE INVENTION

1. Field of the Invention

The present invention relates to a strength member for vehicle use. More particularly, the present invention relates to an air-conditioning duct structure having an air-conditioning duct contained in the strength member for vehicle use.

2. Description of the Related Art

Inside an instrument panel arranged in a front portion of a passenger compartment, that is, in the periphery of a dash panel which divides the passenger compartment from an engine compartment, there is provided a reinforcing bar which functions as a structural member for supporting a steering shaft. This reinforcing bar extends in the width direction of a vehicle, and a wire harness is attached to an upper face of the reinforcing bar.

In this connection, an interior air-conditioning unit of an air-conditioner for vehicle use is usually arranged at the center of a front portion of the passenger compartment, in the vehicle width direction inside the instrument panel. An air-conditioned air flow, the temperature of which has been adjusted by the air-conditioner, is blown out from a center face outlet, which is arranged at the center of the instrument panel in the vehicle width direction, onto a passenger's face at centerside in the passenger compartment. At the same time, an air-conditioned air flow is blown out from right and left side face outlets which are arranged on both end sides of the instrument panel in the vehicle width direction onto a passenger's face at both end sides in the passenger compartment.

Therefore, it is necessary to provide an air-conditioning duct (side face duct) for guiding the air-conditioned air flow from the interior air-conditioning unit, which is located at the center of the instrument panel in the vehicle width direction, to the face outlets which are located at both end sides in the passenger compartment. In general, this air-conditioning duct is arranged inside the instrument panel in such a manner that the air-conditioning duct extends substantially in parallel with the reinforcing bar.

As a result, inside the instrument panel, it is necessary to provide a mounting space, which is exclusively used for mounting the air-conditioning duct, which is different from the space in which the reinforcing bar is arranged. Due to the foregoing, the mounting property of the air-conditioning duct on the vehicle is deteriorated. In order to solve the above problems, the following technique is conventionally proposed. As a structure in which the air-conditioning duct is contained in the reinforcing bar, there is provided a structure in which the same space is used for a mounting space of mounting the air-conditioning duct and a mounting space of mounting the reinforcing bar, by which the mounting property of the air-conditioning duct can be improved.

As described before, the reinforcing bar must support the steering shaft. Therefore, rigidity of the reinforcing bar containing the air-conditioning duct must be somewhat high. For the above reasons, it is common that the reinforcing bar is made of metal. However, when the entire reinforcing bar is made of metal, the weight of the air-conditioning duct is increased.

SUMMARY OF THE INVENTION

In view of the above problems, it is an object of the present invention to provide a reinforcing bar for vehicle use, the rigidity of which is ensured and the weight of which is reduced.

According to the strength member for vehicle use of the first aspect of the present invention, when a region on the driver's seat side, the rigidity of which must be high so that the region can support a steering shaft, is made of metal of high mechanical strength and a region except for the region on the driver's seat side, the rigidity of which is not required to be high, is made of resin, the weight of which is small, it is possible to ensure the rigidity of a reinforcing bar composing the strength member for vehicle use and further it is possible to reduce the weight of the reinforcing bar.

According to the strength member for vehicle use of the second aspect of the present invention, when the reinforcing bar is connected with other portions of a vehicle, the rigidity of the reinforcing bar can be further enhanced.

According to the strength member for vehicle use of the third aspect of the present invention, when the reinforcing bar for supporting the steering shaft is also utilized as an air-conditioning duct, the manufacturing cost can be reduced.

According to the air-conditioning duct structure for vehicle use of the fourth aspect of the present invention, the steering shaft is supported by the reinforcing bar rigidly.

According to the air-conditioning duct structure for vehicle use of the fifth aspect of the present invention, when the air-conditioning duct is formed in a closed space of the reinforcing bar, the height of the instrument panel can be reduced.

According to the air-conditioning duct structure for vehicle use of the sixth aspect of the present invention, the material of a resin member is specified to be a resin, the mechanical strength of which is relatively high, so that the rigidity of the reinforcing bar can be enhanced.

According to the air-conditioning duct structure for vehicle use of the seventh aspect of the present invention, the resin member is reinforced by an extending member made of metal, so that the rigidity of the reinforcing bar can be further enhanced by a relatively low weight material.

According to the air-conditioning duct structure for vehicle use of the eighth aspect of the present invention, various equipment can be mounted on the strength member for vehicle use.

According to the air-conditioning duct structure for vehicle use of the ninth aspect of the present invention, the air-conditioning duct has a heat insulating function. Further, the air-conditioning duct selectively provides a sound absorbing effect.

According to the air-conditioning duct structure for vehicle use of the tenth aspect of the present invention, when a door for changing over a mode, by which an air-conditioned air flow blowing out from an outlet is changed over, is incorporated into an air mixing chamber arranged inside the reinforcing bar, the height of the air-conditioning duct structure can be further reduced and the size can be decreased.

According to the air-conditioning duct structure for vehicle use of the eleventh aspect of the present invention, when a link is incorporated into an air mixing chamber inside the reinforcing bar, the height of the air-conditioner duct structure can be further reduced so that the size can be decreased.

According to the air-conditioning duct structure for vehicle use of the twelfth aspect of the present invention, when an actuator is incorporated into an air mixing chamber inside the reinforcing bar, the height of the air-conditioning duct structure can be further reduced so that the size can be decreased.

According to the air-conditioning duct structure for vehicle use of the thirteenth aspect of the present invention, when an air-conditioned air flow directly flows from each opening provided in the air mixing chamber to each outlet provided in the reinforcing bar, the air-conditioning performance can be enhanced.

According to the air-conditioning duct structure for vehicle use of the fourteenth aspect of the present invention, an air-conditioned air flow directly flows from the side face opening to the side face outlet. Therefore, the flow performance of an air-conditioned air flow can be enhanced.

According to the air-conditioning duct structure for vehicle use of the fifteenth aspect of the present invention, a center face opening in the air mixing chamber and a door are specified, and a side face opening in the air mixing chamber and a door are specified.

According to the air-conditioning duct structure for vehicle use of the sixteenth aspect of the present invention, when a side face opening and a door are arranged on the same face in the air mixing chamber and a foot opening and a door are arranged on the same face in the air mixing chamber, the size of the air mixing chamber can be reduced.

According to the air-conditioning duct structure for vehicle use of the seventeenth aspect of the present invention, the number of components of the air-conditioning duct structure can be reduced. Therefore, the manufacturing cost can be reduced.

According to the air-conditioning duct structure for vehicle use of the eighteenth aspect of the present invention, when a link is arranged at the center of the air mixing chamber inside the reinforcing bar, the size of the air mixing chamber can be reduced.

According to the air-conditioning duct structure for vehicle use of the nineteenth aspect of the present invention, a resin member is reinforced by an extending member made of metal. Therefore, the rigidity of the reinforcing bar can be further enhanced by a relatively low weight material.

According to the air-conditioning duct structure for vehicle use of the twentieth aspect of the present invention, an extending member made of metal and a member made of resin can be easily joined to each other.

According to the air-conditioning duct structure for vehicle use of the twenty-first aspect of the present invention, the number of components of the reinforcing bar can be decreased. Therefore, the manufacturing cost can be reduced.

According to the air-conditioning duct structure for vehicle use of the twenty-second aspect of the present invention, when a portion in which a brace is fastened to the reinforcing bar is formed into a foot duct, the brace can be easily fastened to the reinforcing bar.

According to the air-conditioning duct structure for vehicle use of the twenty-third aspect of the present invention, a portion in which a brace is fastened to the reinforcing bar can be separate from the foot duct. Therefore, the brace can be easily fastened to the reinforcing bar.

According to the air-conditioning duct structure for vehicle use of the twenty-fourth aspect of the present invention, it becomes unnecessary to fasten the brace to the foot duct. Therefore, the manufacturing cost can be reduced.

According to the strength member for vehicle use of the twenty-fifth aspect of the present invention, when a driver's seat side region, the rigidity of which must be especially high to support a steering shaft, is made of metal and a central region is selectively made of metal, the rigidity of a reinforcing bar composing the strength member for vehicle use can be ensured and the weight of the reinforcing bar can be reduced.

According to the air-conditioning duct structure for vehicle use of the twenty-sixth aspect of the present invention, when an air-conditioning duct for vehicle use is formed in a closed space of the reinforcing bar, the height of the instrument panel can be reduced.

According to the air-conditioning duct structure for vehicle use of the twenty-seventh aspect of the present invention, a foamed material can be easily joined to the reinforcing bar member.

The present invention may be more fully understood from the description of preferred embodiments of the invention set forth below, together with the accompanying drawings.

BRIEF DESCRIPTION OF THE DRAWINGS

In the drawings:

FIG. 9 is a table for comparing the performance of a conventional air-conditioning duct structure with the performance of an air-conditioning duct structure of the present invention;

FIG. 11 is a sectional view of the reinforcing bar and the air mixing chamber of the present invention;

FIGS. 15(A) and 15(B) are perspective views of the reinforcing bar of the fifth embodiment of the present invention, and FIG. 15(C) is a table showing a weight effect of the reinforcing bar of the fifth embodiment and also showing that of the conventional reinforcing bar;

DESCRIPTION OF PREFERRED EMBODIMENTS

Figure 1:
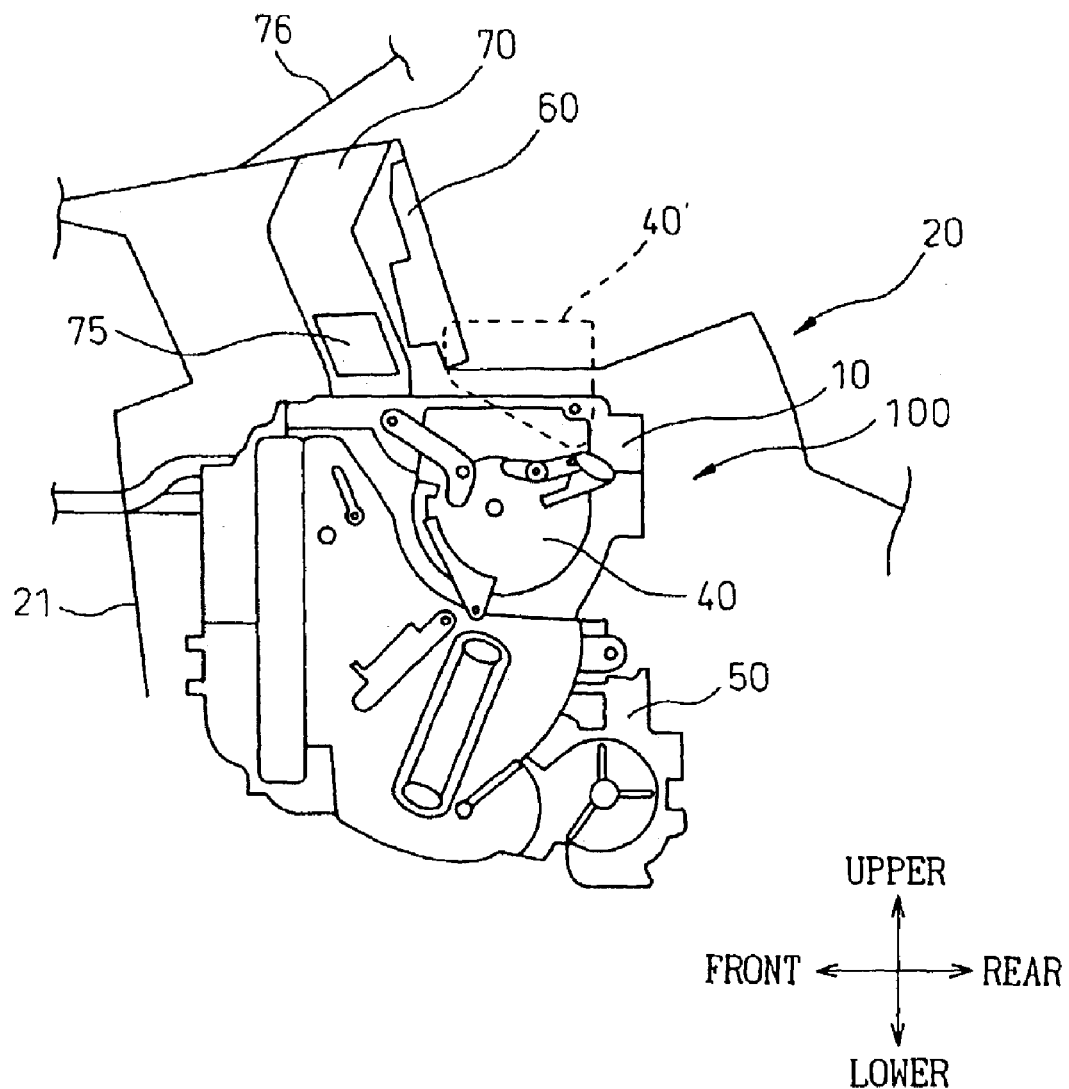
FIG. 1 is a sectional view of an instrument panel including a duct structure for vehicle use of the present invention.
Figure 2:
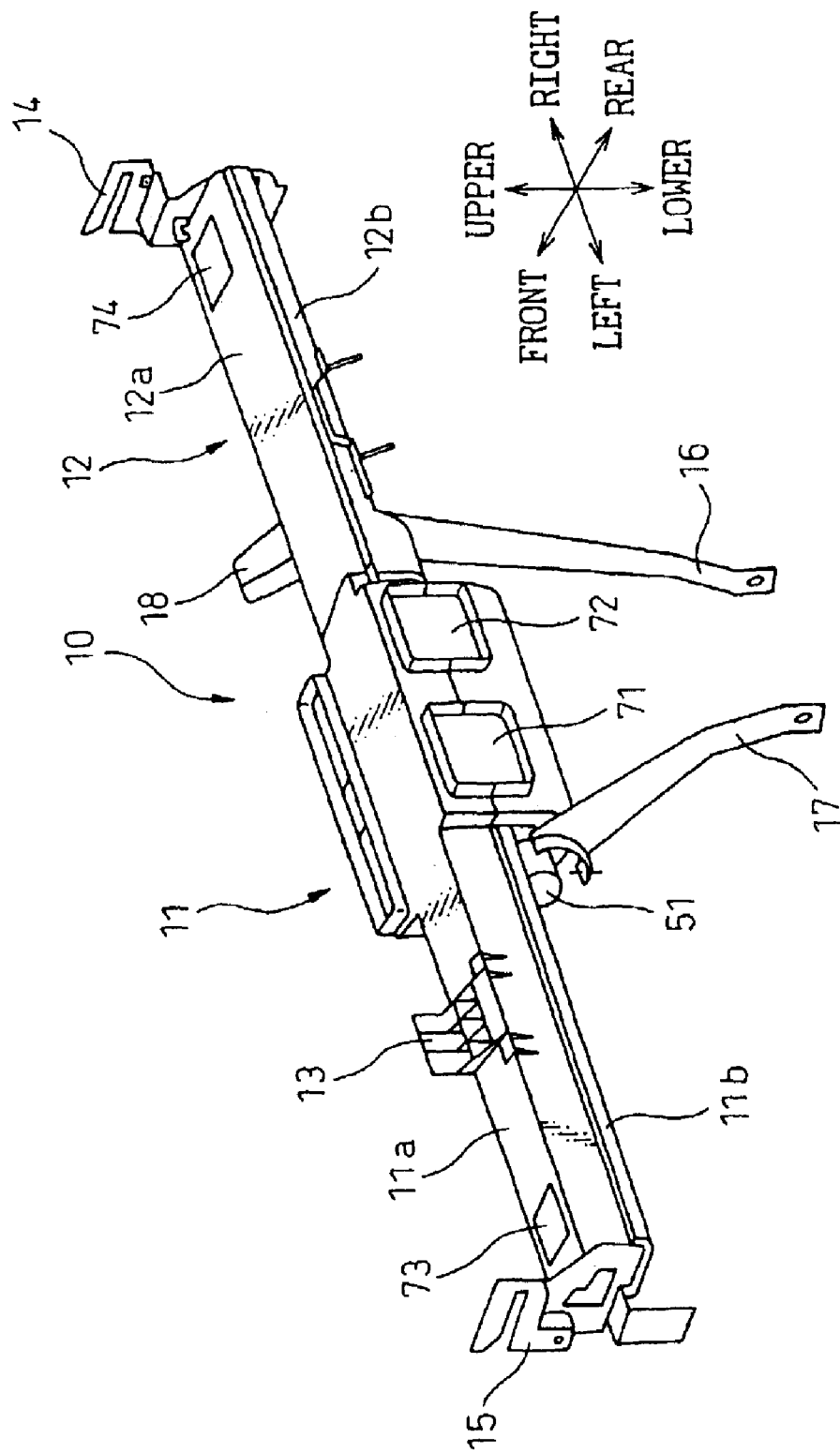
FIG. 2 is a perspective view showing a reinforcing bar of a duct structure for vehicle use of the first embodiment of the present invention.

Referring to the accompanying drawings, an embodiment of the present invention will be explained in detail as follows. First, the first embodiment of the present invention is explained below. FIG. 1 is a sectional view of an instrument panel including a duct structure for vehicle use of the first embodiment of the present invention, and FIG. 2 is a perspective view showing a reinforcing bar of the duct structure for vehicle use of the first embodiment of the present invention. Arrows in FIGS. 1 and 2 show the directions of right and left (width direction), the directions of the upper and lower sides and the directions of the front and rear when the reinforcing bar of the duct structure for vehicle use is mounted on a vehicle. Meters and audio equipment are mounted on the instrument panel 20 which is arranged in a front portion in the passenger compartment, and the instrument panel 20 contains an air-conditioning duct structure 100, the details of which will be explained as follows. On the instrument panel 20, there is provided a center display 60 monitored by a driver and passengers. On the other hand, the instrument panel 20 is partitioned off from the engine room of the vehicle by the dash panel 21.

The reinforcing bar 10 arranged inside the instrument panel 20 will be explained below. Inside the instrument panel 20, there is provided a reinforcing bar 10, which is a strength member for vehicle use, so that the mechanical strength of the instrument panel 20 can be ensured and this reinforcing bar 10 extends in the width direction of the vehicle. In order to reduce the weight, a closed space is formed inside the reinforcing bar 10. This reinforcing bar 10 is provided with a driver's seat side region, a central region and an assistant drivers side region. The drivers seat side region, the mechanical strength of which must be high so as to support a steering shaft, is made of metal of high mechanical strength. The central region and the assistant driver's side region, the mechanical strength of which is not required to be relatively high, are made of only resin, the weight of which is small, or metal and resin. Due to the foregoing, high rigidity and low weight of the strength member for vehicle use can be compatible. In addition, in order to reduce the weight of the reinforcing bar 10, an upper area of the reinforcing bar 10 in the driver's seat side region may be made of resin instead of metal. On the front side of the vehicle in the driver's seat side region, the reinforcing bar 10 is directly joined to one of the metallic reinforcing bars which is connected with the floor of the vehicle and to the metallic reinforcing bar which is connected with the dash panel 21. Therefore, the rigidity of the reinforcing bar 10 can be further enhanced. In this connection, the reinforcing bar 10 may be formed integrally with the air-conditioning duct structure. Alternatively, the reinforcing bar 10 may be formed separately from the air-conditioning duct structure. However, as described as follows referring to the drawings, it is possible to adopt a structure in which the reinforcing bar 10 contains the air-conditioning duct structure. When the reinforcing bar 10 contains the air-conditioning duct structure, the height of the instrument panel 20 can be reduced.

The air-conditioning unit 50 arranged inside the instrument panel 20 will be explained below. The air-conditioning unit 50 is located at the substantial center in the vehicle width direction and adjusts the temperature and humidity of air flowing into the passenger compartment. Therefore, inside the air-conditioning unit 50, there are provided a heat exchanger for cooling (evaporator) and a heat exchanger for heating (hot water type heater core). In an upper portion of the air-conditioning unit 50, there is provided an air mixing chamber 90 in which an air-conditioned air flow is mixed. As shown in FIG. 11, which is a sectional view showing the reinforcing bar and the air mixing chamber of the present invention, the air mixing chamber 90 is arranged protruding upward into the reinforcing bar 10. In this embodiment, the air mixing chamber 90 has a rectangular section. On the side of the air mixing chamber 90 on the rear side of the vehicle, there are provided two center face opening sections 91, 92. On both sides of the air mixing chamber 90, there are provided side face opening sections 93, 94 and foot opening sections 53, 54. Further, on the side (not shown) of the air mixing chamber 90 on the front side of the vehicle, there is provided a defroster opening section (not shown). These opening sections are communicated with the outlets of the reinforcing bar as described below.

The air-conditioner unit 50 can be composed as a completely central type in which the blower unit is located completely at the center. In this type, the blower unit for blowing a air flow of the inside air or the outside air, which is changed over, is integrated with the air-conditioner unit 50. However, it is possible to compose the air-conditioner unit 50 as a semi-central type in which the blower unit is located being offset to the assistant driver's seat side with respect to the air-conditioner unit 50.

Figure 3:
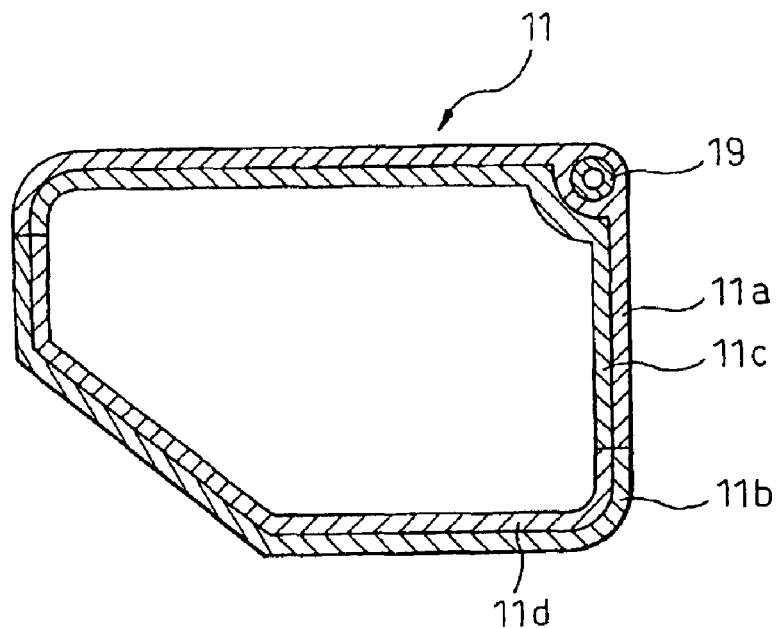
FIG. 3 is a sectional view showing a reinforcing bar on the assistant driver's seat side.
Figure 4:
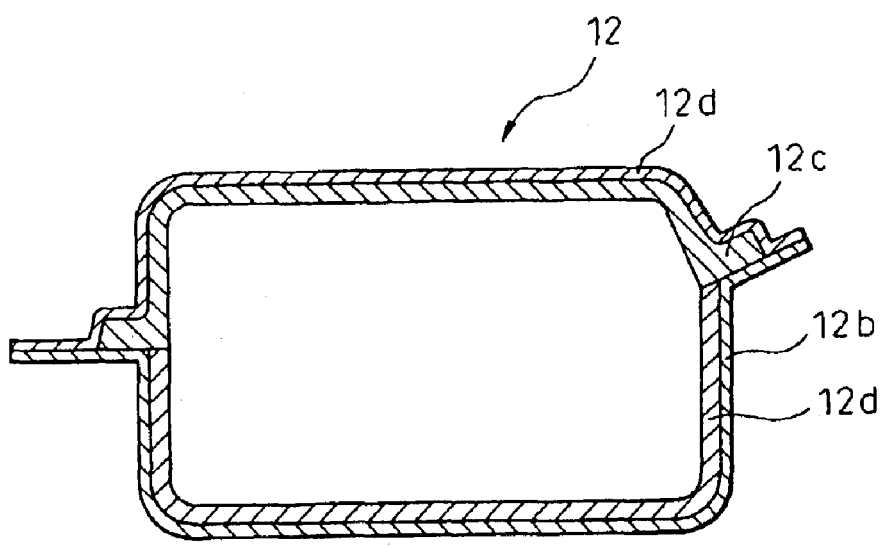
FIG. 4 is a sectional view showing a reinforcing bar on the driver's seat side.

Next, the reinforcing bar 10 will be explained again in detail. The reinforcing bar 10 includes: a hollow assistant driver's seat side reinforcing bar 11 extending in the assistant driver's seat side region and the central region in the longitudinal direction; and a hollow driver's seat side reinforcing bar 12 extending in the driver's seat region. In this embodiment, as shown in FIG. 2, the assistant driver's seat side reinforcing bar 11 and the driver's seat side reinforcing bar 12 are respectively composed of the upper side reinforcing bars 11a, 12a and the lower side reinforcing bars 11b, 12b. FIG. 3 is a sectional view of the assistant driver's seat side reinforcing bar, and FIG. 4 is a sectional view of the driver's seat side reinforcing bar. The assistant driver's seat side reinforcing bar 11 is made of reinforced resin of high mechanical strength such as glass fiber reinforced polyamide (nylon, registered trade mark) or glass fiber reinforced polypropylene, and the driver's seat side reinforcing bar 12 is made of metal such as aluminum. In order to enhance the rigidity of the assistant driver's seat side reinforcing bar 11, as shown in FIG. 3, the hollow rod 19, which is an extended member made of metal, is inserted into the corner of the upper side reinforcing bar 11a. It is preferable that this hollow rod 19 is extended all over the length of the reinforcing bar 11 and joined to the driver's seat side reinforcing bar 12. Alternatively, it is preferable that this hollow rod 19 is integrated with the reinforcing bar 12.

The inner face of the reinforcing bar 10 will be explained below. The inner face of the reinforcing bar 10, that is, the inner faces of the upper side reinforcing bar 11a and the lower side reinforcing bar 11b of the assistant driver's seat side reinforcing bar and the inner faces of the upper side reinforcing bar 12a and the lower side reinforcing bar 12b of the driver's seat side reinforcing bar are covered with the foamed materials 11c, 11d, 12c, 12d as shown in FIGS. 3 and 4. These foamed materials are respectively provided with an air layer and made of flexible heat-insulating and sound-absorbing material capable of being easily bent. Specifically, preferable examples of the foamed material are foamed resins such as foamed urethane, foamed polypropylene and foamed polyethylene. The foamed material may be a foamed sheet or foamed spray material. In these foamed resins, the material itself foams so that an air layer can be formed, which has a heat insulating function. When the degree of foaming and the material of the foamed resin are adjusted, it is possible to provide a sound absorbing effect. However, the material of foamed resin may be material such as hard urethane resin which can mainly exhibit only a heat insulating function.

In this connection, it is possible to adopt a variation of the reinforcing bar 10 in which the assistant driver's seat side reinforcing bar 11 made of resin and the driver's seat side reinforcing bar 12 made of metal are divided from each other at the center in the vehicle width direction. It is possible to adopt another variation of the reinforcing bar 10 composed of a first half section and a second half section, which extend entirely in the vehicle width direction, the cross sections of which are formed into a U-shape. In this reinforcing bar 10, the first half section is made of metal, and the driver's seat side of the second half section is made of metal and the assistant driver's seat side of the second half section is made of resin.

The outlet of the reinforcing bar 10 and the opening of the air mixing chamber will be explained below. First, the position of the outlet is explained. At the center of the reinforcing bar 10 on the side on the rear side of the vehicle, there are provided center face outlets 71, 72 from which conditioned air is blown out toward the face of a passenger. As described above, the center face outlets 71, 72 are arranged on the rear side of the vehicle in this embodiment. Therefore, compared with a conventional structure in which the center face outlets are arranged on the upper face of the reinforcing bar, the height of the air-conditioning duct structure can be reduced, that is, the height of the instrument panel can be reduced. At both side end portions of the side of the reinforcing bar on the rear side of the vehicle, there are provided side face outlets 73, 74 from which conditioned air is blown out toward the face of the passenger or the window-pane. On the sides of the portions of the reinforcing bar protruding to the air-conditioning unit side, there are provided foot outlets 51, 52 from which conditioned air is blown out toward the feet of the passenger. On the side (not shown) of the reinforcing bar on the front side, there are provided center defroster outlets from which conditioned air is blown out toward the window-pane 76. A position of the opening of the air mixing chamber is selected so that conditioned air blown out from the opening can directly flow into the outlet. Therefore, the center face openings 91, 92, the foot openings 53, 54 and the defroster openings are respectively formed facing the center defroster duct 70 respectively communicated with the center face outlets 71, 72, the foot outlets 51, 52 and the defroster outlet. Due to the above structure, it can be guaranteed that conditioned air, which has been blown out from these openings, directly flows into the respective outlets.

On the other hand, as shown in FIG. 11, the side face openings 93, 94 and the side face outlets 73, 74 are distant from each other and, further, an interval between the reinforcing bar 11 and the air mixing chamber 90 is small. Therefore, a position of the side face opening is selected so that the air-conditioning performance can be improved by ensuring the air passages from the side face openings 93, 94 to the side face outlets 73, 74. In this case, in order to direct the side face openings 93, 94 to the side face outlets 73, 74, the side face openings 93, 94 are arranged not on the side on the rear side of the vehicle but on the side of the vehicle.

Next, the structure of the mode changeover device 40 will be explained below. As shown in the exploded perspective view of FIG. 6, the mode changeover device 40 includes: a center face door 41 arranged inside the center face openings 91, 92 in order to adjust a volume of air flow blown out from the center face outlets 71, 72; a foot and side face door 42 in which the foot door section and the side door section are integrated into one body, wherein the foot door section is arranged inside the foot openings 53, 54 so as to adjust a volume of air flow blown out from the foot outlets 51, 52 and the side face section is arranged inside the side face openings 93, 94 so as to adjust a volume of air flow blown out from the side face outlets 73, 74; and a defroster door 75 arranged inside the defroster duct 70 so as to adjust a volume of air flow blown out from the center defroster outlet.

The center face door 41 is like a flat plate and attached to the reinforcing bar 20 so that the center face door 41 can be rotated round the longitudinal shaft 41a extending in the vehicle width direction and the horizontal direction. It is preferable that the center face door 41 is driven by an actuator (not shown) such as a servo motor attached via a link mechanism composed of the links 43, 44, 45 arranged at the center of the air mixing chamber 90.

The foot side face door 42 is attached to the reinforcing bar 20 so that the foot side face door 42 can be rotated round the central shaft 42a extending in the vehicle width direction and the horizontal direction. This foot side face door 42 is driven by an actuator (not shown) such as a servo motor attached via a link mechanism. In this foot side face door 42, the foot door section and the side face door section are integrated into one body and used commonly. Therefore, the number of components can be decreased, and the manufacturing cost can be reduced.

The side face door section is composed of the disks 42b, 42c, having cutout portions, which are attached to both ends of the central shaft 42a. In this case, each of the disks 42b, 42c, having cutout portions, is composed of a cutout portion and a sector section. Due to the above structure of each disk, it is possible for the disk to adjust the degree of opening of the side face outlet 73, 74. In this connection, the center face openings 91, 92 are arranged perpendicularly to the center face door 41, and the side face openings 93, 94 are arranged perpendicularly to the side face door section.

In the foot door section, the plates 42d, 42e are attached to the central shaft 42a between the disks 42b and 42c. These plates 42d, 42e adjust the degree of opening of the foot outlets 51, 52 corresponding to the rotary position of the central shaft 42a. Alternatively, the foot door section is not composed of the disks 42b, 42c, and the side face openings 93, 94 and the side face door section are arranged on the same face of the air mixing chamber, that is, on the side of a portion protruding to the air-conditioning unit side, and the foot openings 53, 54 and the foot door section are arranged on the same face of the air mixing chamber, that is, on the side of a portion protruding to the air-conditioning unit side.

On the other hand, in the same manner as that described above, the defroster door 75 is driven by an actuator (not shown) such as a servo motor via a link mechanism.

As it is conventional that the mode changeover device 40' is arranged outside the reinforcing bar as shown by the broken line in FIG. 1, it is impossible to increase the size of the center display 60. However, according to the present invention, when the mode changeover device 40 is incorporated inside the reinforcing bar 10, the size of the reinforcing bar 10 can be reduced and the size of the center display 60 can be increased.

Figure 12A:
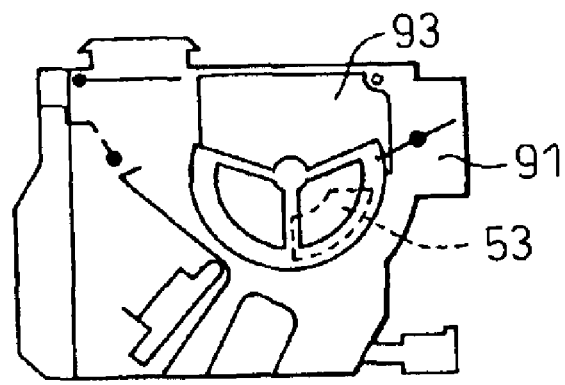
FIGS. 12A–12C are schematic illustrations showing three modes of the mode changeover device of the present invention.
Figure 12B:
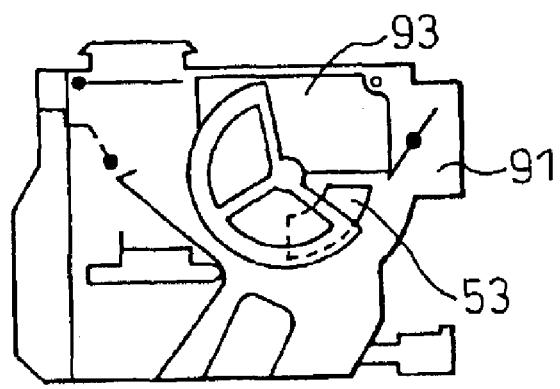
Figure 12C:
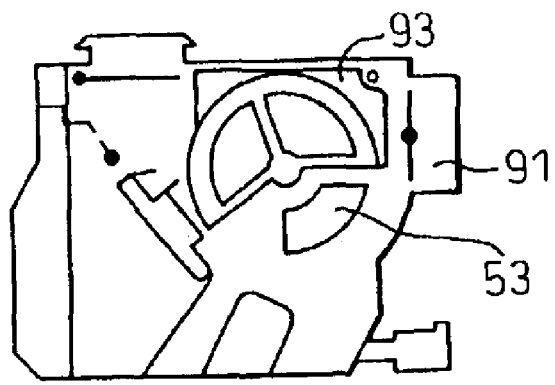

Next, referring to FIG. 12, three modes of the mode changeover device will be explained below. As shown in FIG. 12(A), in the face mode, the foot side face door 42 fully closes the foot openings 53, 54 and opens the side face openings 93, 94. On the other hand, the center face door 41 fully opens the center face openings 91, 92. Due to the foregoing, air-conditioned air is blown to the face of a passenger. In the bi-level mode, as shown in FIG. 12(B), the foot side face door 42 half-opens the foot openings 53, 54 and partially closes the side face openings 93, 94. On the other hand, the center face door 41 half-opens the center face openings 91, 92. Due to the foregoing, the operation of keeping the head cool and keeping the feet warm can be forcibly executed. In the foot mode, as shown in FIG. 12(C), the foot side face door 42 fully opens the foot openings 53, 54 and approximately closes the side face openings 93, 94. At this time, the upper side of the side face door is a little open. On the other hand, the center face door 41 fully closes the center face openings 91, 92. Due to the foregoing, an air-conditioned air flow is blown to the feet of the passenger.

On the other hand, various brackets are attached to the outer face of the reinforcing bar 10. In the reinforcing bar 12 on the driver's seat side, there is provided a steering shaft support 18 to which a support member to support the steering shaft (not shown) is attached. In the reinforcing bar 11 on the assistant driver's seat side, there is provided a bracket 13 for the air bag to which the air bag (not shown) is attached. At the end of the reinforcing bar 12 on the driver's seat side and the end of the reinforcing bar 13 on the assistant driver's seat side, there are provided side brackets 14, 15 made of metal such as aluminum alloy for fixing both ends of the reinforcing bar 10 to the vehicle body.

Figure 5:
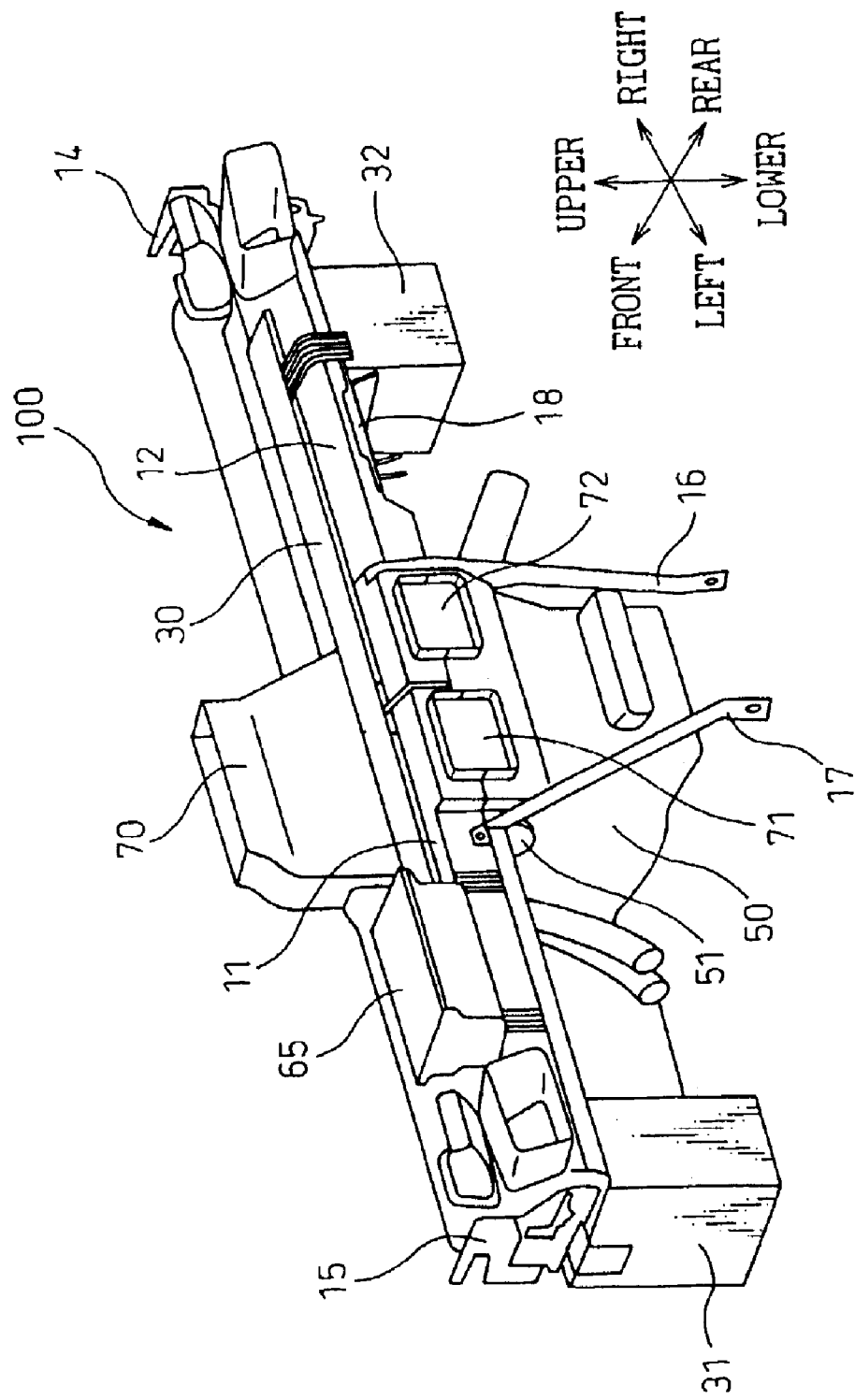
FIG. 5 is a perspective view of the entire air-conditioning duct structure of the present invention.

As shown in FIG. 5 which is a perspective view of the entire air-conditioning duct structure of the present invention, on an upper face of the reinforcing bar 10, there are provided a flat wire harness 30, which is enclosed in a housing made of reinforced resin, and an air bag 65. On a lower face of the reinforcing bar 11 on the assistant driver's seat side, there is provided a first housing 31 made of reinforced resin in which the electronic control unit (referred to as ECU hereinafter) and the integrated board of a junction box are accommodated. On a lower face of the reinforcing bar 12 on the driver's seat side, there is provided a second housing 32 made of reinforced resin in which an ECU board is accommodated.

Figure 13:
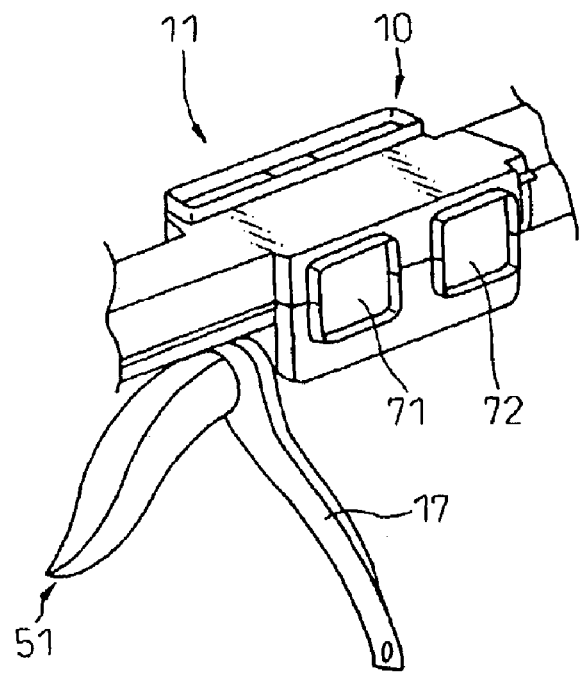
FIG. 13 is a schematic illustration showing a brace and foot duct which are integrally formed.
Figure 14:
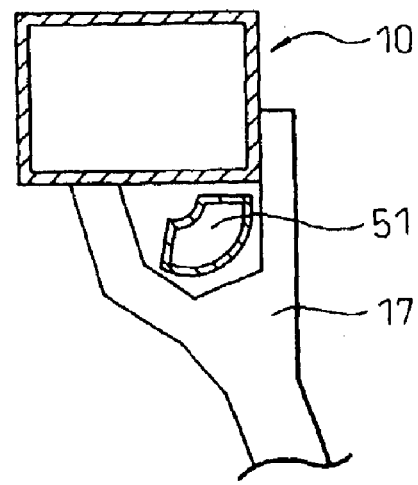
FIG. 14 is a schematic illustration showing a brace attached to the reinforcing bar.

On an outer face of the reinforcing bar 10, there are provided a driver's seat side brace 16 and an assistant driver's seat side brace 17 for supporting the reinforcing bar 10. When a tapping bolt provided at one end of the driver's seat side brace 16 is screwed into the reinforcing bar 12 on the driver's seat side, the driver's seat side brace 16 is fastened to the reinforcing bar 12 on the driver's seat side, and the other end of the driver's seat side brace 16 is fixed to the floor. In the same manner, when a tapping bolt provided at one end of the assistant driver's seat side brace 17 is screwed into the reinforcing bar 11 on the assistant driver's seat side, the assistant driver's seat side brace 17 is fastened to the reinforcing bar 11 on the assistant driver's seat side, and the other end of the assistant driver's seat side brace 17 is fixed to the floor. It is common that the foot duct having the foot outlets 51, 52 protrudes from the reinforcing bar 10 in the periphery of the fastening portion of the braces 16, 17 and the reinforcing bar 10. Therefore, it is difficult for the braces 16, 17 to be fastened to the reinforcing bar 10. Therefore, as a method of solving the above problems in which the profile of the foot duct is maintained as it is so that a pressure loss in the foot duct can not be caused by a change in the profile of the foot duct, there is provided a method in which the braces 16, 17 are fastened to the outside of the foot duct. As another method, as shown in FIG. 13, the brace 16, 17 may be formed integrally with the foot duct so that the brace 16, 17 can be formed as one portion of the foot duct. Due to the foregoing, it becomes unnecessary to fasten the foot duct, and the manufacturing cost can be reduced. Further, there is provided another method of solving the above problems in which an end portion of the brace 16, 17 is formed into Y-shape or O-shape as shown in FIG. 14, and the brace 16, 17 is fastened to the reinforcing bar 10 while this end portion surrounds the foot duct. Due to the above structure, it is possible to fasten the brace to the reinforcing bar at a position distant from the foot duct.

As can be seen in the above descriptions, according to the air-conditioning duct structure for vehicle use of the present invention, when a region on the driver's seat side, the rigidity of which must be high so that the region can support a steering shaft, is made of metal of high mechanical strength and a region except for the region on the driver's seat side, the rigidity of which is not required to be high, is made of resin, it is possible to ensure the rigidity of a reinforcing bar composing the strength member for vehicle use and further it is possible to reduce the weight of the reinforcing bar.

Figure 6:
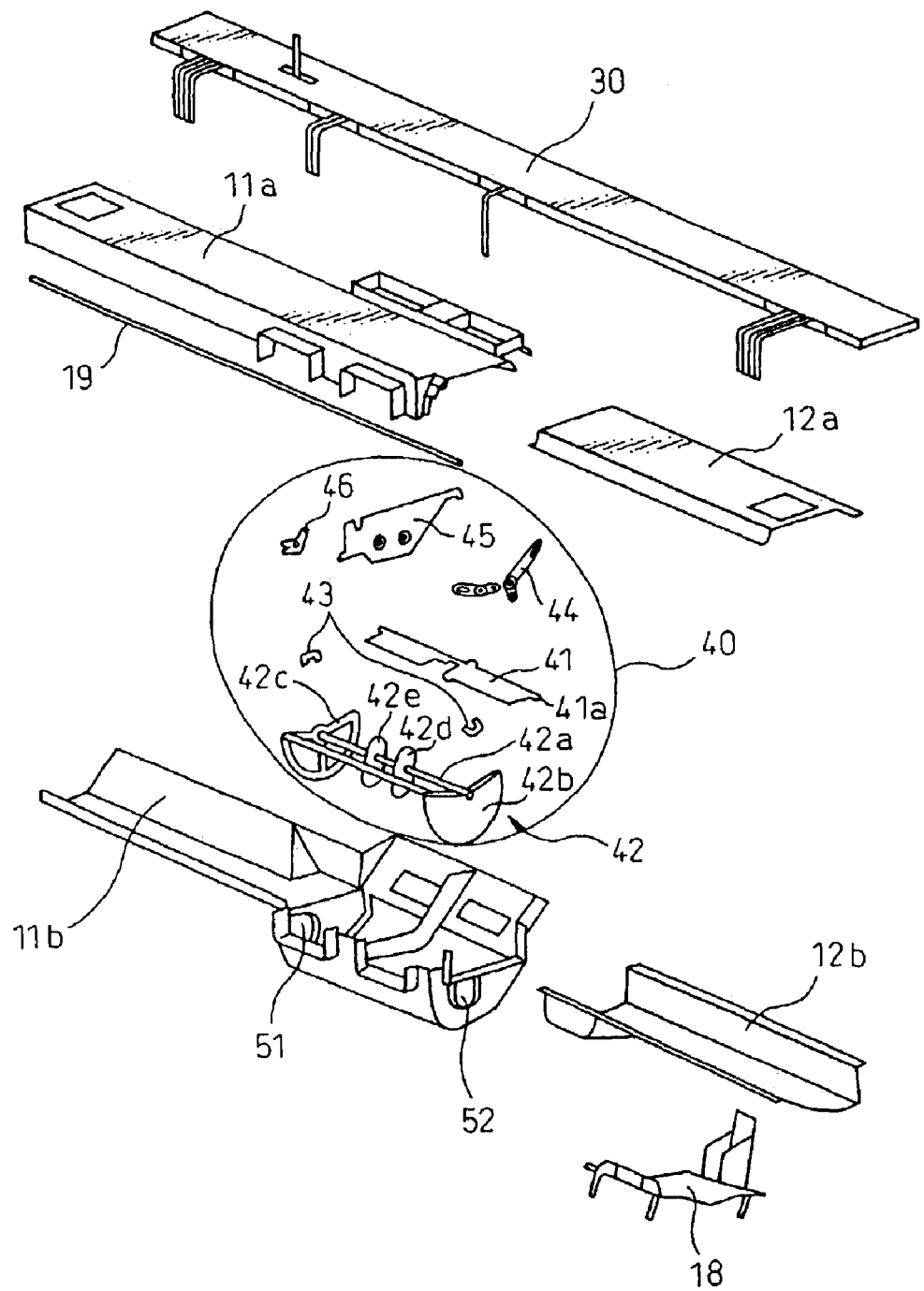
FIG. 6 is an exploded perspective view of the reinforcing bar of the present invention.

Next, referring to FIG. 6, a method of forming the air-conditioning duct structure of the present invention will be explained as follows. First, the cylindrical reinforcing bar 12 on the driver's seat side made of metal is cut off into two pieces. These two pieces are respectively divided into an upper side reinforcing bar 12a and a lower side reinforcing bar 12b. The upper side reinforcing bar 12a of the reinforcing bar 12 on the driver's seat side and the rod 19 made of metal are joined to each other by means of welding.

Next, the reinforcing bar on the driver's seat side and the reinforcing bar on the assistant driver's seat side are subjected to insert molding. The upper side reinforcing bar 12a of the reinforcing bar 12 on the driver's seat side, to which the rod 19 is attached, is set in a mold. Then, the upper side reinforcing bar 11a of the reinforcing bar 11 on the assistant driver's seat side made of reinforced resin, the side braces 14, 15 and the air bag bracket 13 are joined to the upper side reinforcing bar 12a of the reinforcing bar 12 on the driver's seat side. On the other hand, in the same manner as that described above, the lower side reinforcing bar 12b of the reinforcing bar 12 on the drivers seat side is set in a mold and joined to the lower side reinforcing bar 11b of the reinforcing bar 11 on the assistant driver's seat side made of reinforced resin. As described above, by means of insert molding, various members made of metal and various members made of resin can be easily joined to each other.

Next, the steering support 18 is joined to the lower side reinforcing bar 12b of the reinforcing bar 12 on the driver's seat side by means of welding, spot-welding or screwing, and the outside of the upper half and the outside of the lower half of the reinforcing bar 10 are finished. Next, when foamed material is sprayed or coated on the inner faces of the upper half and the lower half of the reinforcing bar 10, the inner face of the reinforce bar 10 can be covered with a layer of foamed material.

Next, under the condition that the mode changeover device 40 is incorporated inside, the upper half portion and the lower half portion of the reinforcing bar 10 are assembled to each other, that is, the upper side reinforcing bar 11a of the reinforcing bar 11 on the assistant driver's seat side and the lower side reinforcing bar 11b are assembled to each other, and the upper side reinforcing bar 12a of the reinforcing bar 12 on the driver's seat side and the lower side reinforcing bar 12b are assembled to each other. In the case of reinforcing bar 11 on the assistant driver's seat side made of reinforced resin, assembling is conducted by the method of vibration welding or screwing. In the case of reinforcing bar 12 on the driver's seat side made of metal, assembling is conducted by the method of riveting, spot welding or screwing.

After the completion of the reinforcing bar 10, the first housing 31, the second housing 32, the center defroster duct 70, the air-conditioning unit 60, the driver's seat side brace 16 and the assistant driver's seat side brace 17 are assembled to the reinforcing bar 10. In this connection, the air-conditioning unit 60 is made of resin. On the other hand, a portion of the reinforcing bar 10 connected with the air-conditioning unit 60 is made of resin. Therefore, the engagement can be easily accomplished. Finally, when the flat wire harness 30 is attached to the reinforcing bar 10, the air conditioning duct structure of the present invention can be accomplished as shown in FIG. 5.

Figure 7:
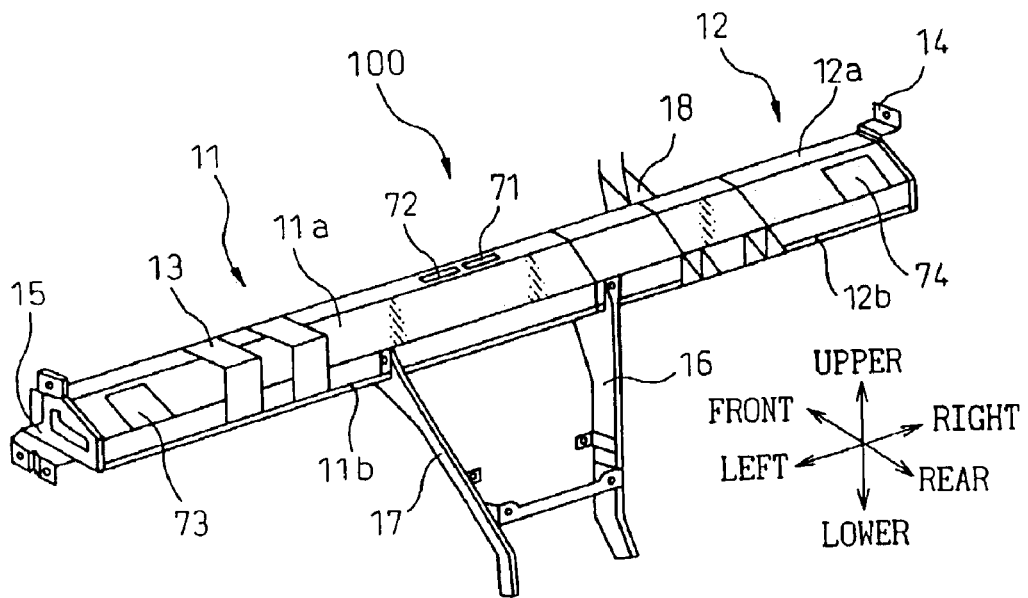
FIG. 7 is a perspective view of the reinforcing bar of the duct structure for vehicle use of the second embodiment of the present invention.

Next, the air-conditioning duct structure of the second embodiment will be explained below. FIG. 7 is a perspective view of the reinforcing bar of the duct structure for vehicle use of the second embodiment of the present invention. In order to distinctively show a difference between the first and the second embodiment, some components such as an air-conditioning unit 50 are omitted in FIG. 7. As shown in FIG. 7, this embodiment is different from the first embodiment at the following points. In this embodiment, the mode changeover device 40 is arranged outside the reinforcing bar 10, for example, the mode changeover device 40 is arranged in the air-conditioning unit below the reinforcing bar 10. However, the air-conditioning duct structure of this embodiment is the same as that of the first embodiment in the following points. The reinforcing bar 10 is composed of the reinforcing bar 11 on the assistant driver's seat side and the reinforcing bar 12 on the driver's seat side; the reinforcing bar 11 on the assistant driver's seat side is made of resin; and the reinforcing bar 12 on the driver's seat side is made of metal. Due to the above structure, it is possible to ensure the rigidity of the reinforcing bar and reduce the weight of the reinforcing bar.

Figure 8:
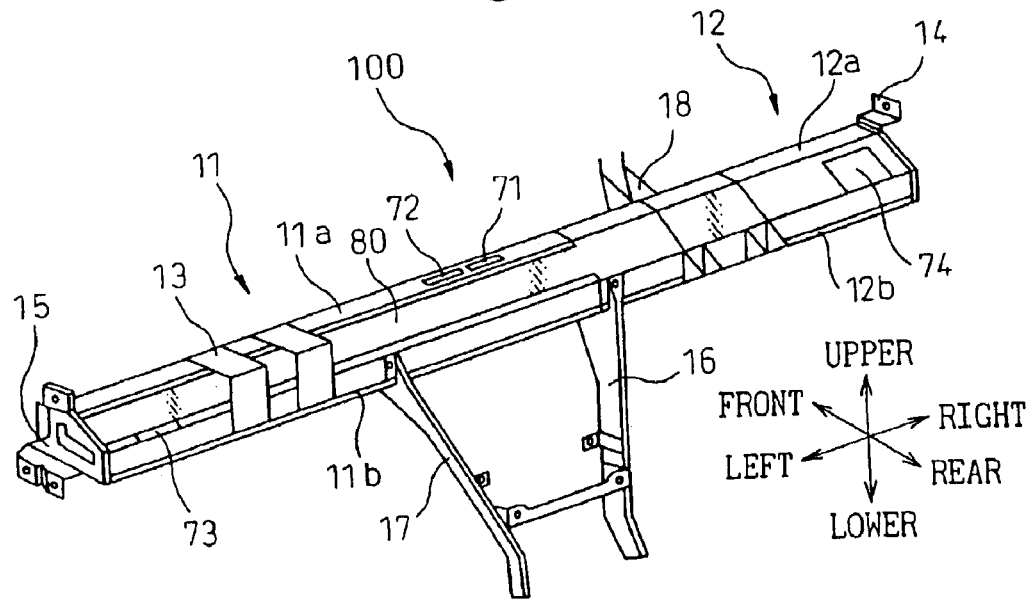
FIG. 8 is a perspective view of the reinforcing bar of the duct structure for vehicle use of the third embodiment of the present invention.

Next, the third embodiment of the present invention will be explained below. FIG. 8 is a perspective view of the reinforcing bar of the duct structure for vehicle use of the third embodiment of the present invention. In order to distinctively show a difference between this embodiment and the first and second embodiments, some components such as an air-conditioning unit 50 are omitted in FIG. 8. In the same manner as that of the second embodiment, the mode changeover device 40 is arranged outside the reinforcing bar 10 in this embodiment. As shown in FIG. 8, in this embodiment, the metallic member 80 extending from one end portion of the reinforcing bar 12 on the driver's seat side to an end portion on the assistant driver's seat side is joined to the reinforcing bar 11 on the assistant driver's seat side made of resin. Due to the above structure, while the rigidity of the reinforcing bar 11 on the assistant driver's seat side made of resin is being ensured, the weight of the reinforcing bar can be reduced.

Figure 10:
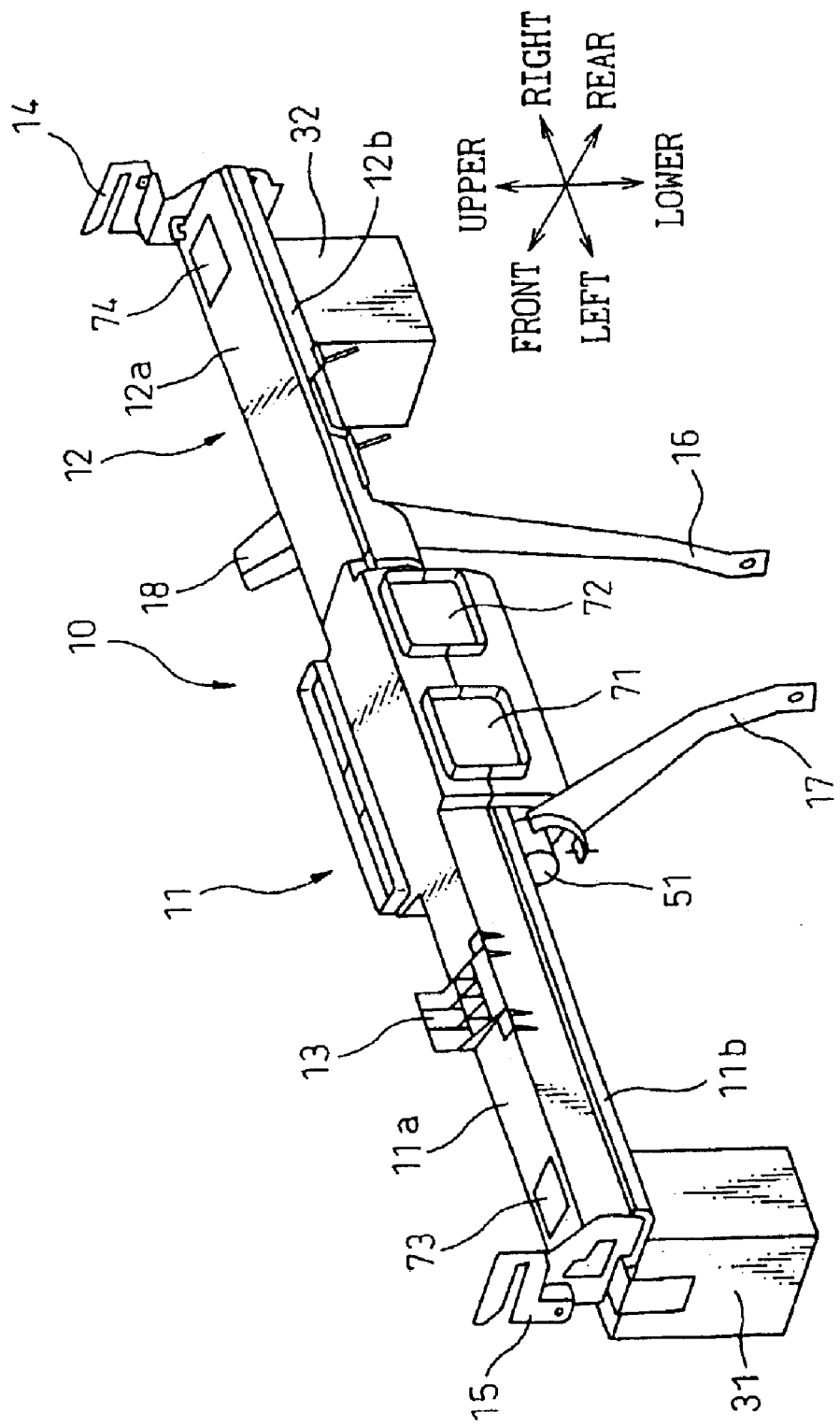
FIG. 10 is a perspective view of the reinforcing bar of the duct structure for vehicle use of the third embodiment of the present invention.

Next, the fourth embodiment of the present invention will be explained below. FIG. 10 is a perspective view of the reinforcing bar of the duct structure for vehicle use of the fourth embodiment of the present invention. In the first embodiment, the reinforcing bar 10, the first housing 31 and the second housing 32 are respectively formed differently from each other, and then the first housing 31 and the second housing 32 are assembled to the reinforcing bar 10. On the other hand, in this embodiment, as shown in FIG. 10, when insert molding is conducted, the first housing 31 and the second housing 32 are assembled to the reinforcing bar 10. Due to the foregoing, in this embodiment, the air-conditioning duct structure can be more easily assembled.

Next, referring to FIGS. 15 and 20, the fifth embodiment of the present invention will be explained below. In this embodiment, the metallic member 80 of the reinforcing bar 10 has a closed section at least in the driver's seat side region. In the other regions, the metallic member 80 of the reinforcing bar 10 has a closed section or an open section. A cylindrical duct made of foamed material such as urethane foam or a cylindrical duct made of resin is joined inside the metallic member 80. When the above structure is adopted, foamed material or resin seldom contributes to the enhancement of the mechanical strength. However, the above structure is advantageous in that the weight of the device can be remarkably reduced. In FIG. 15(A), there is shown a metallic member which has a closed section in the driver's seat side region and an open section, the upper face of which is open, in the central region and the assistant driver's seat side region. When foamed material is joined to a portion of the open section of the metallic member by means of foaming spray or foaming injection, the reinforcing bar 10 (referred to as type A), the section of which is closed in all regions, can be formed as shown in FIG. 15(B). As a variation of type A, it is possible to adopt a reinforcing bar 10 (referred to as type B) in which a region of the open section extends only to the assistant driver's seat side region. As shown in FIG. 15(C) in which the weight effect of the reinforce bar of this embodiment is compared with the weight effect of the conventional reinforce bar, it can be recognized that the weight of type A and that of type B are smaller than the weight of the conventional type.

Figure 16A:
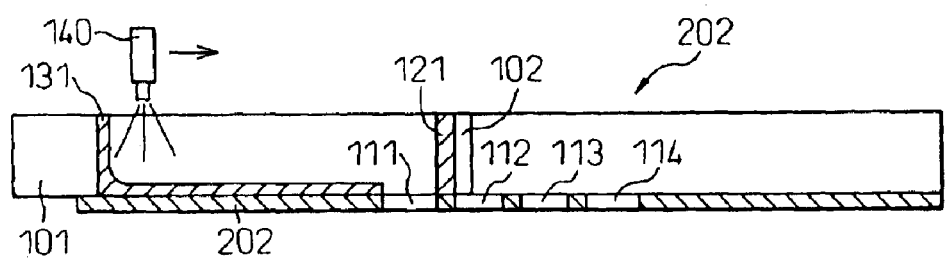
FIGS. 16A–16C are schematic illustrations showing a forming process of forming a lower side member of the reinforcing bar of the fifth embodiment of the present invention by means of foaming spray.

Next, referring to FIGS. 16 and 17, explanations will be made into a forming process conducted by foaming spray of the reinforcing bar 10 of the fifth embodiment of the present invention. The metallic member includes: an upper side member 201, the profile of which is flat, of the same plane as the open region of the open section; and a lower side member 202 having a U-shaped section, at the center of which the air-conditioning unit communication holes 111, 112, 113, 114 are formed. When the upper side member 201 and the lower side member 202 are combined with each other, a cylindrical shape is formed. First, referring to FIG. 16, the forming process of forming the lower side member 202 is explained below. AS shown in FIG. 16(A), the jig 101, which is covered with a mold releasing agent so that the jig 101 can be easily separated from foamed material, is arranged on one open end face of the lower side member 202, and the jig 102 is arranged so that it can block the air-conditioning unit communication hole 112. Under the above conditions, liquid foamed material is sprayed to the region between the jigs 101 and 102 with the spray unit 140. Due to the foregoing, the inner face in this region is covered with foamed material. On the open end face, the wall 131 is formed, and the wall 121 is formed between the air-conditioning unit communication holes 111 and 112.

Figure 16B:
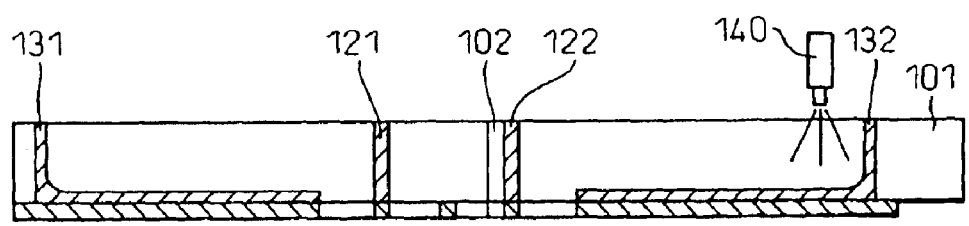
Figure 16C:
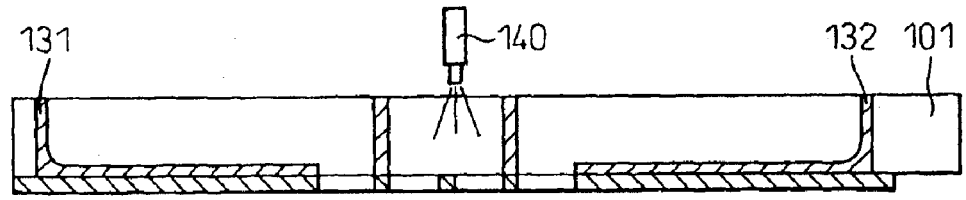
Figure 17A:
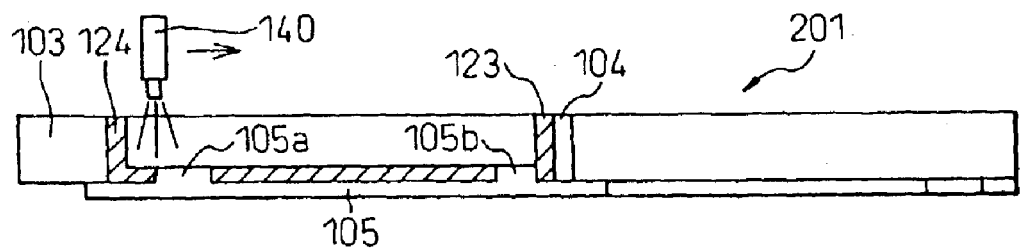
FIGS. 17A–17C are schematic illustrations showing a forming process of forming an upper side member of the reinforcing bar of the fifth embodiment of the present invention by means of foaming spray.
Figure 17B:
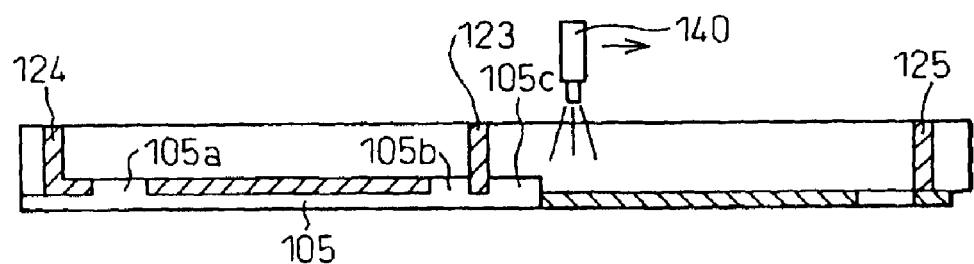
Figure 17C:
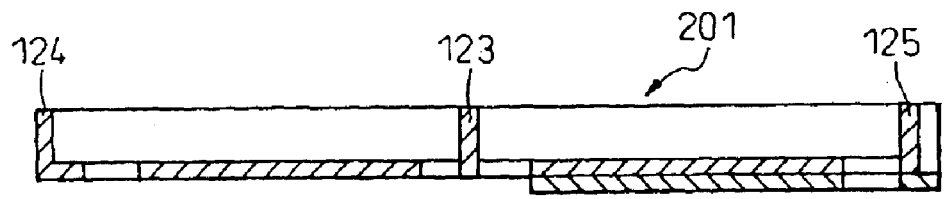

Next, as shown in FIG. 16(B), the jig 101 is arranged on the other open end face of the lower side member 202, and foamed material is sprayed by the spray unit 140 between the jigs 101 and 102 under the condition that the jig 102 is arranged so that it blocks the air-conditioning unit communication hole 113. In this way, the inner face is coated with foamed material. On the open end face, the wall 132 is formed, and the wall 122 is also formed between the air-conditioning unit communication holes 111 and 112. Finally, as shown in FIG. 16(C), an inner face between the walls 121 and 122 is coated with foamed material by the spray unit 140. In this way, forming of the lower side member 202 is completed. Next, referring to FIG. 17, a forming process of the upper side member 201 will be explained below. As shown in FIG. 17(A), the jig 103 is arranged at a position corresponding to the end face on the open region side of the upper side member 201, and the flat jig 105 is arranged in the open region and further the jig 104 is arranged at the center in parallel with the end face. The jig 105 is provided with protrusions 105a, 105b to form the opening sections. Foamed material is sprayed into a space surrounded by the jigs 103, 104, 105 by the spray unit 140. In this way, the wall 124, the plate-shaped portion in the upper face region, in which the portions corresponding to the protrusions 105a, 105b become the opening sections, and the wall 123 are formed. Next, as shown in FIG. 17(B), further, the protrusion 105c is arranged in the jig 105. Under the condition that the jig 103 is arranged on the other end face of the upper side member 201, foamed material is sprayed between the jigs 103 and 105 by the spray unit 140. In this way, as shown in FIG. 17(C), the inner face of the metallic member is coated with foamed material and, on the open end face, the wall 125 is formed, and the wall 122 is formed between the air-conditioning unit communication holes 111 and 112. In this way, forming of the upper side member 201 is completed. When the upper side member 201 and the lower side member 202, which are formed in this way, are joined to each other, the reinforcing bar 10 can be composed. Forming conducted by means of foaming spray in this way is advantageous in that the degree of freedom of forming is high.

Figure 18A:
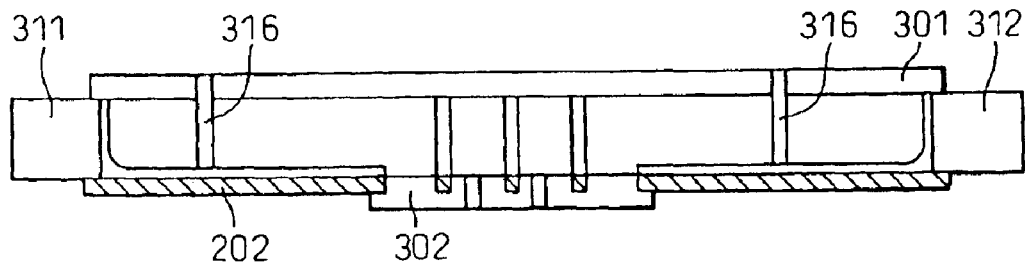
FIGS. 18A and 18B are schematic illustrations showing a forming process of forming a lower side member of the reinforcing bar of the fifth embodiment of the present invention by means of foaming injection.
Figure 18B:
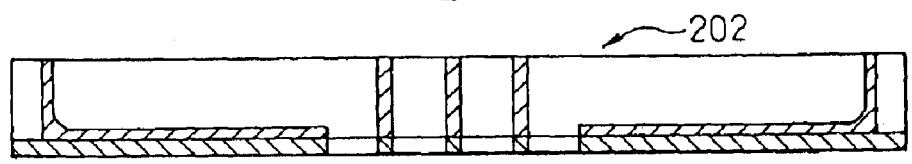
Figure 19A:
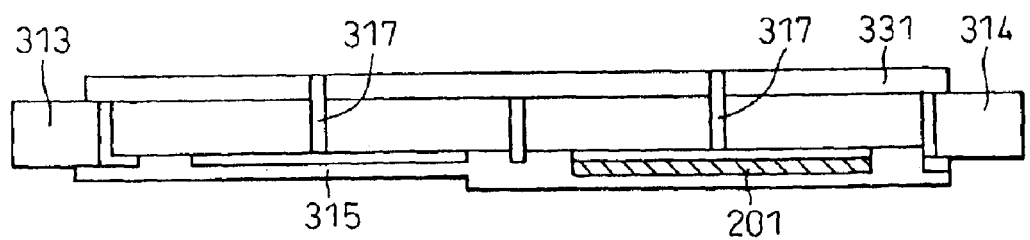
FIGS. 19A and 19B are schematic illustrations showing a forming process of forming an upper side member of the reinforcing bar of the fifth embodiment of the present invention by means of foaming injection.
Figure 19B:
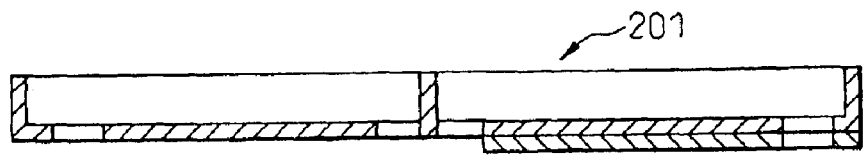

Next, referring to FIGS. 18 and 19, a forming process of forming the reinforcing bar 10 of the fifth embodiment by means of foaming injection will be explained below. First, a forming process of forming the lower side member 202 will be explained as follows. First, as shown in FIG. 18(A), a cavity is formed by the upper mold 301, the lower side member 202 made of metal, the lower mold 302 to close the air-conditioning unit communication hole of the lower side member 202 and the jigs 311, 312 to close both end faces of the lower side member. Next, foamed material is injected from the gate 316 of the upper mold 301. In this way, forming of the lower side member 202 is completed as shown in FIG. 18(B). Next, a forming process of the upper side member will be explained below. First, as shown in FIG. 19(A), a cavity is formed by the upper mold 331, the jig 315 to hold the lower side member 201 and the jigs 313, 314 to close both end faces of the upper side member. Next, foamed material is injected from the gate 317 of the upper mold 331. In this way, forming of the lower side member 202 is completed as shown in FIG. 19(B). When the upper side member 201 and the lower side member 202, which are formed in this way, are joined to each other, the reinforcing bar 10 can be composed. Forming conducted by means of foaming spray in this way is advantageous in that manufacturing can be easily performed.

Figure 20A:
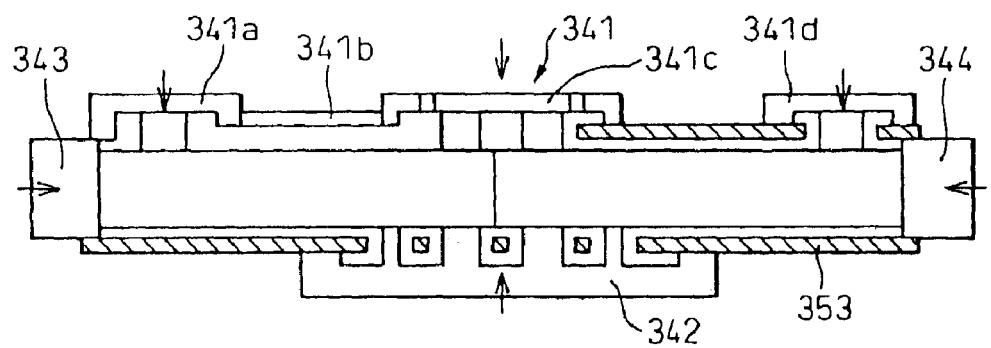
FIGS. 20A and 20B are schematic illustrations showing a forming process of forming a reinforcing bar of the fifth embodiment of the present invention by means of foaming injection.
Figure 20B:
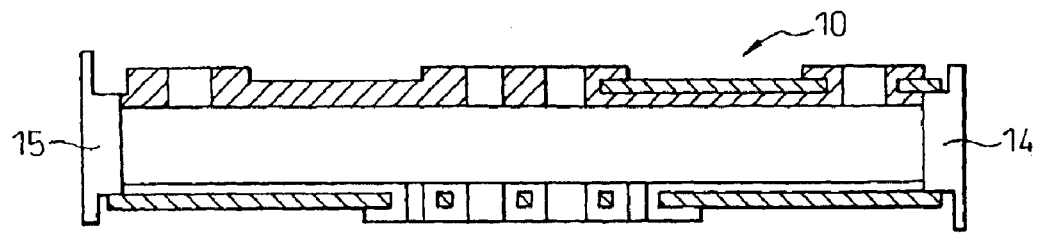

Further, referring to FIG. 20, explanations will be made into foaming injection by which the reinforcing bar 10 is integrally formed in the step of injection. As shown in FIG. 20(A), the substantially cylindrical member 353 made of metal is arranged inside. Then, a cavity is formed when the upper mold 341 to partition an upper face of the reinforcing bar 10, the lower mold 342 to partition a lower face of the reinforcing bar 10 and the jigs 343, 344 to partition both end faces and the inner face of the reinforcing bar 10 between the upper mold 341 and the lower mold 342 are attached to the cylindrical member 353 made of metal as shown by the arrows in the drawing. In this connection, the upper mold 341 is composed of a first section 341a, a second section 341b, a third section 341c and a fourth section 341d. Next, foamed material is injected from the gate of the upper mold 341, and the reinforcing bar 10 is formed as shown in FIG. 20(B), and then the brackets 14, 15 are joined to both end faces of the reinforcing bar 10. In this way, manufacturing is completed.

Finally, referring to FIG. 9, a result of analysis will be explained below in which the air-conditioning duct structure of the present invention and the air-conditioning duct structure of the prior art are compared with each other with respect to the vibration rigidity, mechanical strength and weight. FIG. 9 is a table on which the performance of the air-conditioning duct structure of the present invention and that of the air-conditioning duct structure of the prior art are compared with each other. The objective examples of analysis are: the conventional example 1 in which the reinforcing bar is a rod; the conventional example 2 in which the reinforcing bar has a triangular section; the second embodiment of the present invention, the profile of which is approximately the same as the conventional example 2; and the third example, the profile of which is substantially the same as the conventional example and the second embodiment. Analysis items are: the minimum resonant frequency, the air bag development load, the reinforcing bar weight and the weight of the entire structure including the reinforcing bar. In this connection, the minimum resonant frequency is the natural frequency of the air-conditioning duct structure. The higher the minimum resonant frequency, the higher the rigidity with respect to vibration. The air bag development load is the mechanical strength necessary when the air bag is developed, and the unit of the air bag development load is an intensity of the force per unit length.

Comparison will be made for each analysis item. Concerning the minimum resonant frequency, all examples are satisfactory. Concerning the air bag developing load, the values of the samples 3 and 4 of the structure of the present invention are lower than the values of the samples 1 and 2 of the structure of the prior art. However, the values of the samples 3 and 4 of the structure of the present invention exceed the reference value of 500 N/mm. On the other hand, concerning the load of the reinforcing bar and the load of the entire structure of the air-conditioning duct, the loads of the second embodiment are lower than the loads of the conventional example by a value not less than 800 g, and the loads of the third embodiment are lower than the loads of the conventional example by a value not less than 300 g.

As described above, according to the air-conditioning duct structure of the present invention, while the reference values of the vibration rigidity and mechanical strength are satisfied, the weight and size can be reduced.

While the invention has been described by reference to specific embodiments chosen for purposes of illustration, it should be apparent that numerous modifications could be made thereto by those skilled in the art without departing from the basic concept and scope of the invention.

What is claimed is:

1. A strength member for vehicle use extending in the vehicle width direction inside an instrument panel of a vehicle, having a reinforcing bar in which a closed space is formed, the reinforcing bar having a driver's seat side region, a central region and an assistant driver's seat side region, the driver seat side region of the reinforcing bar being composed of only a metallic member, both the central region and the assistant driver's seat side region being composed of a resin and metallic member, and an air conditioning duct structure for vehicle use is formed in a closed space of the strength member.

2. A strength member for vehicle use according to claim 1, wherein the strength member for vehicle use is directly joined to a first metallic reinforcing bar connected with a floor of the vehicle and a second metallic reinforcing bar connected with a dash panel in the front portion of the vehicle.

3. A strength member for vehicle use according to claim 1, wherein a steering shaft is attached to the reinforcing bar on the driver's seat side.

4. An air-conditioning duct structure for vehicle use formed in a closed space of a strength member for vehicle use extending in the vehicle width direction inside an instrument panel of a vehicle, having a reinforcing bar in which the closed space is formed, the reinforcing bar having a driver's seat side region, a central region and an assistant driver's seat side region, the drivers seat side region of the reinforcing bar being composed only of a metallic member and both the central region and the assistant driver's seat side region being composed of a resin member.

5. An air-conditioning duct structure for vehicle use according to claim 4, wherein the resin member is made of glass fiber reinforced resin.

6. An air-conditioning duct structure for vehicle use according to claim 4, wherein the resin member is joined to an extending member made of metal extending from the metallic member.

7. An air-conditioning duct structure for vehicle use according to claim 4, wherein the reinforcing bar includes a bracket for attaching an air bag, a bracket for attaching a junction box and a bracket for attaching ECU.

8. An air-conditioning duct structure for vehicle use according to claim 4, wherein the resin member and the metallic member are respectively composed of an upper side member and a lower side member, and an inside of the reinforcing bar is covered with a foamed material sheet or a foamed spray material.

9. An air-conditioning duct structure for vehicle use according to claim 4, wherein an air mixing chamber of an air-conditioning unit is protruded inside the reinforcing bar, the reinforcing bar has a plurality of outlets, and doors for adjusting the degree of openings arranged in the air mixing chamber are respectively arranged corresponding to the plurality of outlets so that volumes of conditioned-air blown out from the plurality of outlets can be adjusted.

10. An air-conditioning duct structure for vehicle use according to claim 9, wherein a link mechanism connected with the door so as to move the door is arranged in the air mixing chamber.

11. An air-conditioning duct structure for vehicle use according to claim 9, wherein the plurality of outlets of the reinforcing bar are a side face outlet, a center face outlet, a foot outlet and a center defroster outlet, and the openings corresponding to the outlets are a side face opening a center face opening, a foot opening and a defroster opening, and each door arranged in each opening is directed to each outlet.

12. An air-conditioning duct structure for vehicle use according to claim 9, wherein a side face opening and a corresponding door are directed in the air mixing chamber so that an conditioned-air air flow can be directly blown out in the vehicle width direction from the side face opening of the air mixing chamber toward side face outlets respectively arranged on both sides of the reinforcing bar.

13. An air-conditioning duct structure for vehicle use according to claim 9, wherein a center face opening and a corresponding door, and a side face opening and a corresponding door are arranged in the air mixing chamber perpendicularly to each other.

14. An air-conditioning duct structure for vehicle use according to claim 9, wherein a side face opening and a corresponding door, and a foot face opening and a corresponding door are arranged in the air mixing chamber on the same face.

15. An air-conditioning duct structure for vehicle use according to claim 9, wherein a side face door and a foot door are integrated into one body.

16. An air-conditioning duct structure for vehicle use according to claim 10, wherein the link is arranged at the substantial center in the air mixing chamber.

17. An air-conditioning duct structure for vehicle use according to claim 6, wherein the extending member made of metal extends in the vehicle width direction from the metallic member.

18. An air-conditioning duct structure for vehicle use according to claim 17, wherein the extending member made of metal and the resin member are made by means of insert molding.

19. An air-conditioning duct structure for vehicle use according to claim 17, wherein the reinforcing bar is composed of a first half section and a second half section extending in the vehicle width direction, the cross sections of which are formed into a U-shape, the first half section is made of metal, the second half section is made of metal in the driver's seat side region and made of resin in the assistant driver's seat side region, and a closed space is formed in the reinforcing bar when the first half section and the second half section are combined with each other.

20. An air-conditioning duct structure for vehicle use according to claim 4, wherein a foot outlet is arranged at an end of a foot duct extending from the reinforcing bar, and an end of a brace connecting the reinforcing bar with a floor of the vehicle is fastened to the outside of the foot duct.

21. An air-conditioning duct structure for vehicle use according to claim 4, wherein a foot outlet is arranged at an end of a foot duct extending from the reinforcing bar, and an end portion on the reinforcing bar side of a brace connecting the reinforcing bar with a floor of the vehicle is formed into a Y-shape.

22. An air-conditioning duct structure for vehicle use according to claim 4, wherein a foot outlet is arranged at an end of a foot duct extending from the reinforcing bar, and a brace connecting the reinforcing bar with a floor of the vehicle is formed being integrated with the foot duct so that the brace composes a portion of the foot duct.

* * * * *